(12) United States Patent
Sogabe et al.

(10) Patent No.: US 12,632,923 B2
(45) Date of Patent: May 19, 2026

(54) LEARNING METHOD, HIGH RESOLUTION PROCESSING METHOD, LEARNING APPARATUS AND COMPUTER PROGRAM

(71) Applicant: NTT, Inc., Tokyo (JP)

(72) Inventors: Yoko Sogabe, Musashino (JP); Shiori Sugimoto, Musashino (JP); Takayuki Kurozumi, Musashino (JP); Hideaki Kimata, Musashino (JP)

(73) Assignee: NTT, Inc., Tokyo (JP)

( * ) Notice: Subject to any disclaimer, the term of this patent is extended or adjusted under 35 U.S.C. 154(b) by 492 days.

(21) Appl. No.: 17/925,737

(22) PCT Filed: May 18, 2020

(86) PCT No.: PCT/JP2020/019698
§ 371 (c)(1),
(2) Date: Nov. 16, 2022

(87) PCT Pub. No.: WO2021/234797
PCT Pub. Date: Nov. 25, 2021

(65) Prior Publication Data
US 2023/0196512 A1 Jun. 22, 2023

(51) Int. Cl.
*G06T 3/4046* (2024.01)
*G06T 5/60* (2024.01)

(52) U.S. Cl.
CPC .............. *G06T 3/4046* (2013.01); *G06T 5/60* (2024.01); *G06T 2207/10036* (2013.01); *G06T*

2207/20016 (2013.01); *G06T 2207/20081* (2013.01); *G06T 2207/20084* (2013.01)

(58) Field of Classification Search
CPC . G06T 2207/20081; G06T 2207/20084; G06T 3/4046; G06T 5/60; G06T 5/00; G06T 2207/20016; G06T 2207/10036; G06N 3/02–0985

See application file for complete search history.

(56) References Cited

U.S. PATENT DOCUMENTS

2021/0127101 A1* 4/2021 Roh ........................ H04N 23/55
2021/0350590 A1* 11/2021 Kim .......................... G06T 5/60

OTHER PUBLICATIONS

Diamond, Steven, et al. "Unrolled optimization with deep priors." arXiv preprint arXiv:1705.08041v2 (2017). (Year: 2018).*

(Continued)

*Primary Examiner* — Geoffrey E Summers
(74) *Attorney, Agent, or Firm* — Harness, Dickey & Pierce, P.L.C.

(57) ABSTRACT

An aspect of the present invention is a learning method for learning a model which reconstructs data and acquires reconstructed data, the learning method includes a plurality of stages, and the learning method includes first sub-processing which is based on an iterative calculation algorithm in which a Lagrange multiplier is not used, second sub-processing which is based on an iterative calculation algorithm in which the Lagrange multiplier is used, and weighting sub-processing which determines processing in each of the plurality of stages based on a weight for determining usage of the first sub-processing and the second sub-processing in each stage.

7 Claims, 7 Drawing Sheets

(56) References Cited

OTHER PUBLICATIONS

Guo, Hongbo, Shi Liu, and Hongqi Guo. "Hybrid iterative reconstruction method for imaging problems in ECT." IEEE Transactions on Instrumentation and Measurement 69.10 (2020): 8238-8249. (Year: 2020).*

Kellman, Michael, et al. "Memory-efficient Learning for Large-scale Computational Imaging." arXiv preprint arXiv:2003.05551v1 (2020). (Year: 2020).*

Liu, Risheng, et al. "Proximal alternating direction network: A globally converged deep unrolling framework." Proceedings of the AAAI Conference on Artificial Intelligence. vol. 32. No. 1. 2018. (Year: 2018).*

Sun, Shiliang, et al. "A survey of optimization methods from a machine learning perspective." IEEE transactions on cybernetics 50.8 (2019): 3668-3681. (Year: 2019).*

Yang, Yan, et al. "ADMM-CSNet: A deep learning approach for image compressive sensing." IEEE transactions on pattern analysis and machine intelligence 42.3 (2018): 521-538. (Year: 2018).*

Lizhi Wang et al., "Hyperspectral Image Reconstruction Using a Deep Spatial-Spectral Prior", In the IEEE conference on computer vision and pattern recognition (CVPR), pp. 8032-8041, IEEE, Jun. 2019.

Jian Zhang et al., "ISTA-Net: Interpretable Optimization-Inspired Deep Network for Image Compressive Sensing", Computer vision foundation, pp. 1828-1837, 2018.

* cited by examiner

FIG. 1

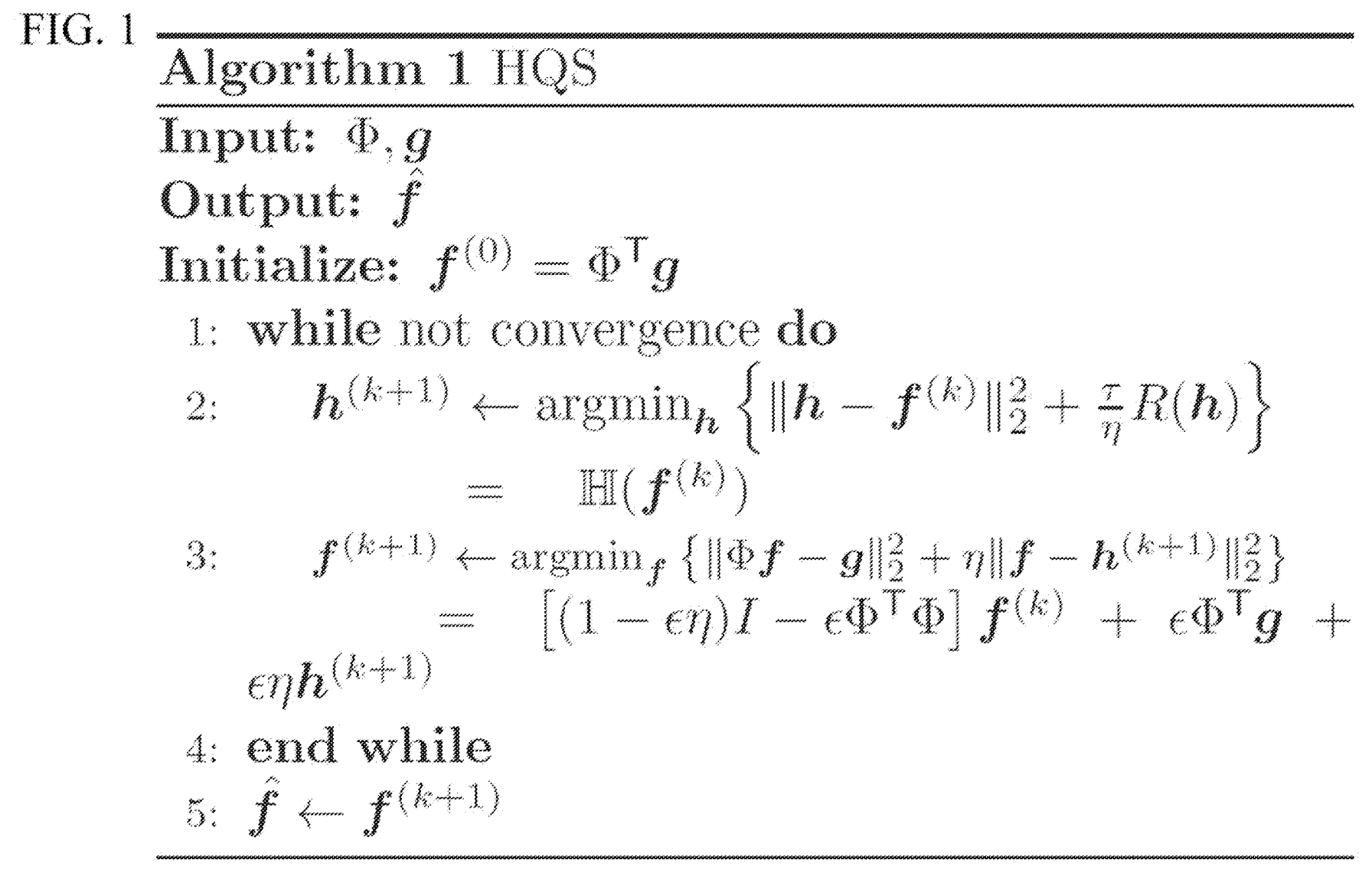

Algorithm 1 HQS

Input: $\Phi$, $g$

Output: $\hat{f}$

Initialize: $f^{(0)} = \Phi^T g$

1: while not convergence do

2: $\quad h^{(k+1)} \leftarrow \arg\min_h \left\{ \|h - f^{(k)}\|_2^2 + \frac{\tau}{\eta} R(h) \right\}$ $\quad\quad = \mathrm{HI}(f^{(k)})$ 3: $\quad f^{(k+1)} \leftarrow \arg\min_f \left\{ \|\Phi f - g\|_2^2 + \eta \|f - h^{(k+1)}\|_2^2 \right\}$ $\quad\quad = \left[ (1 - \epsilon \eta) I - \epsilon \Phi^T \Phi \right] f^{(k)} + \epsilon \Phi^T g +$ $\quad\quad\quad \epsilon \eta h^{(k+1)}$ 4: end while

5: $\hat{f} \leftarrow f^{(k+1)}$

FIG. 2

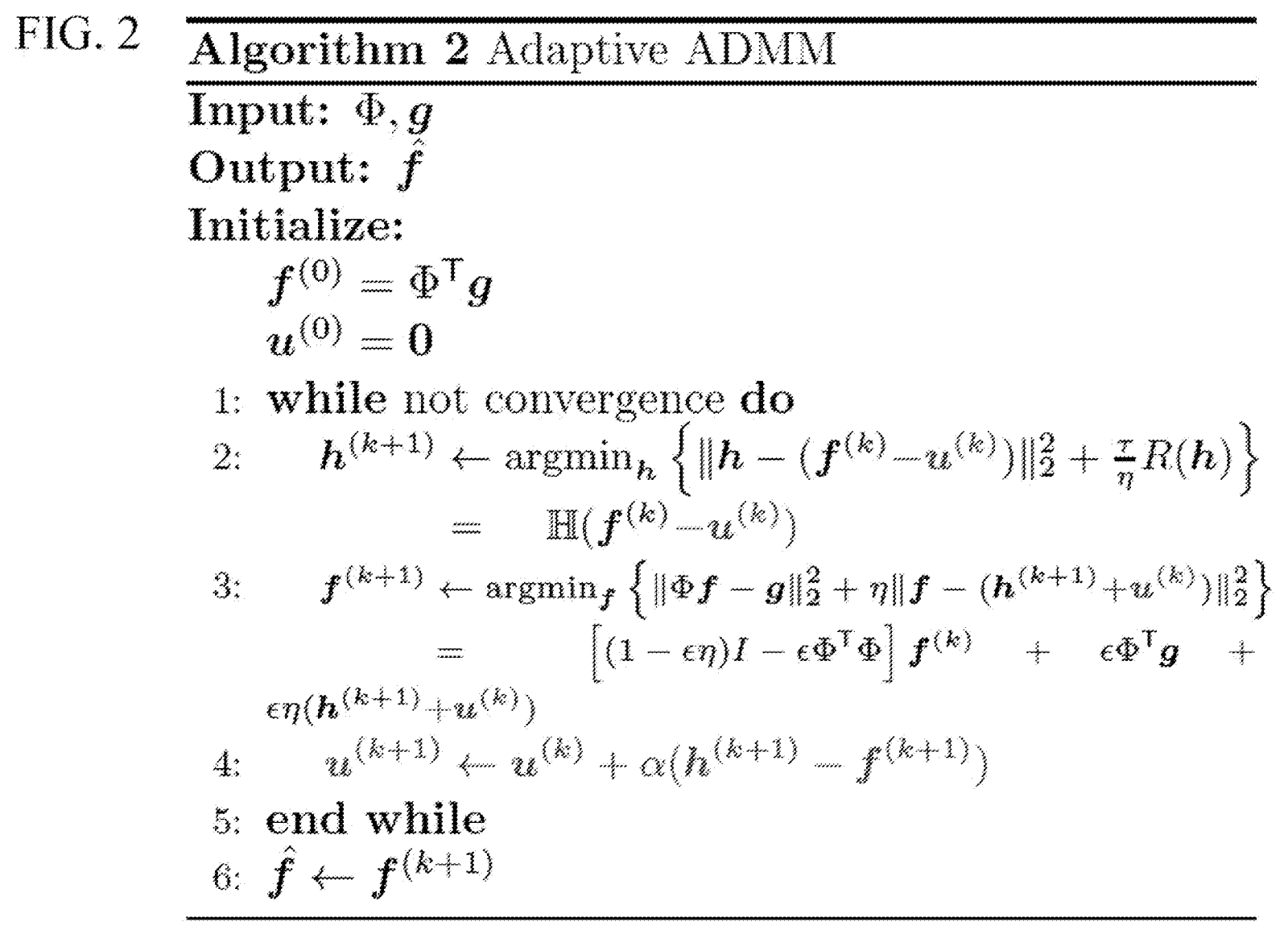

Algorithm 2 Adaptive ADMM

Input: $\Phi, g$
Output: $\hat{f}$
Initialize:
$f^{(0)} = \Phi^\top g$
$u^{(0)} = 0$ 1: while not convergence do

2: $\quad h^{(k+1)} \leftarrow \operatorname{argmin}_h \left\{ \|h - (f^{(k)} - u^{(k)})\|_2^2 + \frac{\tau}{\eta} R(h) \right\}$ $\quad\quad = \mathbb{H}(f^{(k)} - u^{(k)})$ 3: $\quad f^{(k+1)} \leftarrow \operatorname{argmin}_f \left\{ \|\Phi f - g\|_2^2 + \eta\|f - (h^{(k+1)} + u^{(k)})\|_2^2 \right\}$ $\quad\quad = \left[(1-\epsilon\eta)I - \epsilon\Phi^\top\Phi\right] f^{(k)} + \epsilon\Phi^\top g +$ $\quad\quad \epsilon\eta(h^{(k+1)} + u^{(k)})$ 4: $\quad u^{(k+1)} \leftarrow u^{(k)} + \alpha(h^{(k+1)} - f^{(k+1)})$ 5: end while

6: $\hat{f} \leftarrow f^{(k+1)}$

FIG. 8

| | | HQS [7] $K=9$ | Proposed $K=9$ | Proposed $K=7$ |
|---|---|---|---|---|
| ICVL 1300 × 1392 × 31 | time [sec] | 0.45 | 0.47 | 0.38 |
| | PSNR [dB] | 38.90 | 39.73 | 39.07 |
| | SSIM | 0.9533 | 0.9599 | 0.9526 |
| | SAM | 0.0307 | 0.0276 | 0.0307 |
| KAIST 3376 × 2704 × 31 | time [sec] | 2.20 | 2.32 | 1.80 |
| | PSNR [dB] | 41.85 | 42.68 | 42.00 |
| | SSIM | 0.9678 | 0.9712 | 0.9682 |
| | SAM | 0.06870 | 0.06201 | 0.06675 |

FIG. 9

| stage index | 1 | 2 | 3 | 4 | 5 | 6 | 7 | 8 | 9 |
|---|---|---|---|---|---|---|---|---|---|
| $\alpha$ | -2.7e-05 | 2.0e-05 | 3.9e-05 | -1.3e-06 | 3.6e-05 | 5.6e-06 | 2.9e-04 | 0.64 | - |

LEARNING METHOD, HIGH RESOLUTION PROCESSING METHOD, LEARNING APPARATUS AND COMPUTER PROGRAM

CROSS-REFERENCE TO RELATED APPLICATIONS

This application is a 371 U.S. National Phase of International Application No. PCT/JP2020/019698, filed on May 18, 2020. The entire disclosure of the above application is incorporated herein by reference.

TECHNICAL FIELD

The present invention relates to techniques of a learning method, a high resolution processing method, a learning apparatus and a computer program.

BACKGROUND ART

In recent years, a technique of a reconstruction problem has been studied. FIG. 10 is a schematic view in which the reconstruction problem is generalized and shown. The reconstruction problem is defined as a problem which estimates, when, e.g., a known observation signal and a known observation matrix are given, a target signal based on the observation signal and the observation matrix. Such a reconstruction problem is applied in, e.g., a technique of compressed sensing. For example, when the target signal is an image, by using the observation signal observed by the compressed sensing and the known observation matrix, it becomes possible to estimate an actual target signal. For example, it is considered to apply the compressed sensing also to a hyperspectral image (see, e.g., NPL 1 and NPL 2).

CITATION LIST

Non Patent Literature

[Non-Patent Literature 1] Lizhi Wang, Chen Sun, Ying Fu, Min H. Kim, and Hua Huang. Hyperspectral image reconstruction using a deep spatial-spectral prior. In The IEEE Conference on Computer Vision and Pattern Recognition (CVPR), pp. 8032-8041. IEEE, June 2019.
[Non-Patent Literature 2] Jian Zhang et al., "ISTA-Net: Interpretable Optimization-Inspired Deep Network for Image Compressive Sensing" Computer Vision Foundation, pp. 1828-1837

SUMMARY OF THE INVENTION

Technical Problem

Conventionally, it has been considered to view the reconstruction problem as a convex optimization problem which minimizes the sum of two cost terms including a cost term related to consistency between a reconstructed signal and an observation signal and a cost term related to similarity to properties which the reconstructed signal should have based on previous knowledge, and solve the reconstruction problem by using an iterative calculation algorithm for convex optimization. Thereafter, it is considered to apply the iterative calculation algorithm to a deep neural network (hereinafter referred to as "DNN"). By implementing each step of the iterative calculation algorithm correspondingly to each stage of the DNN, accuracy in reconstruction is improved.

However, in the conventional art, there are cases where accuracy in reconstruction is not adequate.

In view of the above circumstances, an object of the present invention is to provide a technique capable of achieving an improvement in accuracy in the reconstruction of data.

Means for Solving the Problem

An aspect of the present invention is a learning method for learning a model which reconstructs data and acquires reconstructed data, the learning method including a plurality of stages, the learning method including: first sub-processing which is based on an iterative calculation algorithm in which a Lagrange multiplier is not used; second sub-processing which is based on an iterative calculation algorithm in which the Lagrange multiplier is used; and weighting sub-processing which determines processing in each of the plurality of stages based on a weight for determining usage of the first sub-processing and the second sub-processing in each stage.

An aspect of the present invention is a high resolution processing method for enhancing resolution of a hyperspectral image, the high resolution processing method including: acquiring a target hyperspectral image; and enhancing resolution of the acquired hyperspectral image, wherein a cost term representing similarity to the hyperspectral image and a cost term representing a property of a known hyperspectral image are optimized simultaneously in enhancing resolution, and the optimization is constituted by combining an iterative calculation algorithm in which a Lagrange multiplier is used and an iterative calculation algorithm in which the Lagrange multiplier is not used.

An aspect of the present invention is a learning apparatus for learning a model which reconstructs data and acquires reconstructed data, the learning apparatus including a plurality of stages, the learning apparatus including a learner which executes: first sub-processing which is based on an iterative calculation algorithm in which a Lagrange multiplier is not used; second sub-processing which is based on an iterative calculation algorithm in which the Lagrange multiplier is used; and weighting sub-processing which determines processing in each of the plurality of stages based on a weight for determining usage of the first sub-processing and the second sub-processing in each stage.

An aspect of the present invention is a computer program for causing a computer to execute the learning method described above.

Effects of the Invention

According to the present invention, it becomes possible to achieve the improvement in accuracy in the reconstruction of the data.

BRIEF DESCRIPTION OF DRAWINGS

FIG. 1 is a view showing the outline of an algorithm of HQS (Half Quadratic Split-ting).

FIG. 2 shows reconstruction processing which uses adaptive ADMM.

FIG. 8 is a table showing an evaluation result by objective indexes.

FIG. 9 is a table showing values of a parameter α obtained by learning.

DESCRIPTION OF EMBODIMENTS

Figure 3:
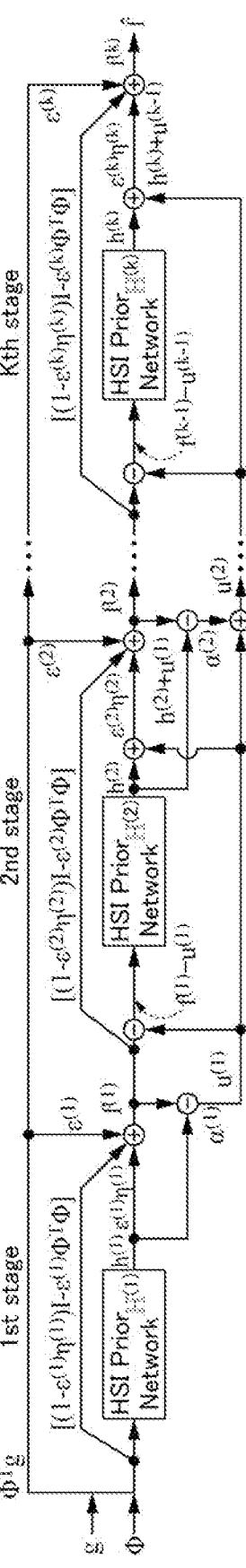
FIG. 3 is a view showing the outline of a DNN in the case where an algorithm of k-time iterative calculation is applied to the DNN having K layers.

First, the outline of the present invention will be described. In the present invention, a parameter is introduced in order to allow appropriate switching between ADMM and HQS in each stage of a DNN. The significances of the introduction of the parameter (α) for switching between the HQS and the ADMM are to achieve high reconstruction performance with a small number of stages, and to stabilize learning.

In order to explain the significance of adaptive switching, first, a difference between the ADMM and the HQS will be described and, next, the significance of the adaptive switching will be described. A reconstruction problem is a convex optimization problem which minimizes the sum of two cost terms including a cost term related to consistency between a reconstructed signal and an observation signal, and a cost term related to similarity to properties which the reconstructed signal should have based on previous knowledge. It is difficult to optimize the sum of the two terms at the same time, and hence each of the HQS and the ADMM uses an approach in which the convex optimization problem is divided into two sub-problems related to the individual terms and the two sub-problems are alternately solved repeatedly. On the other hand, the two terms are terms dependent on the same reconstructed signal, and cannot be evaluated independently of each other normally. Each of the HQS and the ADMM uses a method in which, by replacing the reconstructed signals of the two terms with other variables and placing a constraint in which the variables are identical to each other, it is guaranteed that the signals are identical to each other. The ADMM evaluates the constraint in which the reconstructed signals included in the two terms are identical to each other more strictly than the HQS. Accordingly, in general, the ADMM tends to have high reconstruction performance.

Based on a difference in the usage of the constraint between the ADMM and the HQS, the significance of performing the adaptive switching will be described. First, a description will be given of achievement of high reconstruction performance with a small number of stages. In general, the ADMM evaluates the constraint strictly, and hence the reconstruction performance thereof tends to be high. On the other hand, with the initial number of stages, an error is large, and hence it is better to fluctuate a value significantly, but the constraint suppresses the significant fluctuation. If capability to adaptively switch between the ADMM and the HQS is provided in each stage, it is possible to adopt HQS in a previous stage and adopt the ADMM in a subsequent stage, and hence it is possible to achieve both of a small number of stages and high reconstruction performance.

Next, a description will be given of stabilization of learning. When the DNN based on the HQS or the ADMM is learned, in the case where the constraint in which the two terms are linked is evaluated extremely strictly, gradient explosion easily occurs, and it is difficult to perform learning. Especially at an initial step of the learning in which the constraint is completely disobeyed, a gradient in backpropagation tends to be large. Accordingly, in the case of the ADMM, it is more difficult to perform the learning than in the case of the HQS. In the present invention, by setting an initial value of a parameter such that the HQS is used at the initial step of the learning, stability of the learning is secured. When the learning progresses, the parameter fluctuates, and, as a result, the ADMM is used.

Next, details of the embodiment of the present invention will be described with reference to the drawing.

Figure 10:
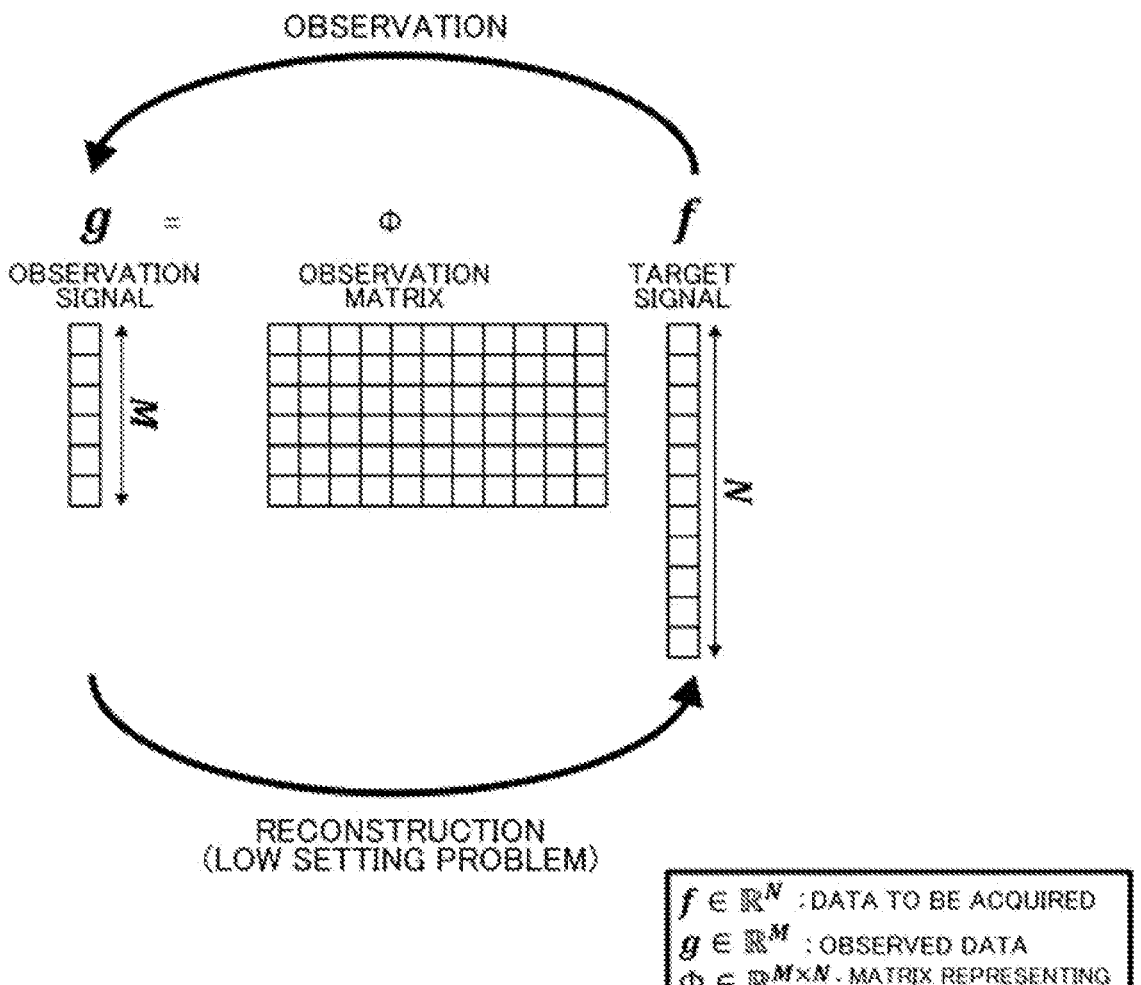
FIG. 10 is a schematic view in which a reconstruction problem is generalized and shown.

A reconstruction problem shown in FIG. 10 is defined as the following optimization problem:

[Math. 1]

$$\hat{f} \leftarrow \operatorname*{argmin}_{f}\{\|\Phi f - g\|^2 + \tau R(f)\}, \qquad \text{Formula 1}$$

where $\tau$ is an adjustment parameter, and R is a regularization term. The first term evaluates whether a solution (f) has consistency with observation. The regularization is based on prior information (Prior) of a target signal f. The prior information is defined from properties of the target signal f which are known in advance.

FIG. 1 is a view showing the outline of an algorithm of the HQS (Half Quadratic Splitting) which is one of convex optimization methods. The HQS is the algorithm which separates Formula 1 described above into two sub-problems and alternately solves the sub-problems. The first sub-problem shown in the second line does not depend directly on $\phi$ or g related to observation but depends on the regularization term R. Further, this sub-problem does not use R apparently, and is solved by a given black box function H (bold and open "H"). This substitution can be explained by using, e.g., a reconstruction method called Plug-and-Play (PnP). The PnP is a framework of reconstruction which uses a denoiser. Another sub-problem shown in the third line does not depend on the prior information but depends on $\phi$ and g related to observation. This sub-problem can be solved by using a gradient method. $\varepsilon$ denotes a step size, and $\eta$ denotes a weight of a penalty term. The HQS solves Formula 1 by alternately solving the two sub-problems repeatedly until the two sub-problems converge.

Next, the ADMM (Alternating Direction Method of Multipliers) and the HQS are compared with each other. The ADMM is superior in the following two points to the HQS. First, in the HQS, convergence is not proved at the present moment for any convex problem. In addition, in the ADMM, convergence is faster than that in the HQS, and the ADMM has high accuracy. In consideration of these advantages, in the present invention, processing is performed by using the ADMM in preference to the HQS.

Next, a description will be given of adaptive ADMM which is a mathematical convex optimization algorithm by ADMM iterative calculation. The adaptive ADMM is obtained by adding a learning parameter to an update formula of a Lagrange multiplier of the ADMM. FIG. 2 shows reconstruction processing which uses the adaptive ADMM. The main difference between the ADMM and HQS in the algorithm is a Lagrange multiplier (u) in the fourth line. The Lagrange multiplier serves as a bridge between the two sub-problems, and the ADMM thereby achieves performance higher than that of the HQS. In addition, the adaptive ADMM shown in FIG. 2 is different from normal ADMM in that the adaptive ADMM has a parameter α in the fourth line. The parameter α is added to the update formula of the Lagrange multiplier. In the case of α≡1, the adaptive ADMM substantially functions as the normal ADMM. In the case of α≡0, the adaptive ADMM substantially functions as the HQS. In the parameter α, a value is defined independently for each iteration. For example, in the parameter α, a value which differs from one iteration to another may be defined. With such a configuration, behavior between the HQS and the ADMM can be switched adaptively for each iteration. This adaptability achieves high-speed and high-accuracy reconstruction.

FIG. 3 is a view showing the outline of a DNN in the case where an algorithm of K-time iterative calculation shown in FIG. 2 is applied to the DNN having K layers (hereinafter also referred to as "network"). In FIG. 3, the DNN is configured as the DNN which receives input of especially an observation matrix ϕ and a coded image g, and outputs a reconstructed hyperspectral image "f^". Each stage corresponds to processing of one iterative calculation of the adaptive ADMM shown in FIG. 2. As the network structure of H (bold and open "H": prior networks), the network structure identical to that of spatial-spectral prior networks shown in, e.g., NPL 1 may be used. All parameters of the individual layers are individually defined. ε(k), η(k), α(k), and H(k) denote ε, η, α, and H in the k-th stage. ε(k), η(k), α(k), and H(k) are values obtained by learning processing. All parameters are learned at the same time. The k-th stage, especially, can perform behavior at the midpoint between the HQS and the ADMM according to α(k). A loss function is assumed to be a mean square error of network output (f^) and a correct answer (f_G). Note that "f^" denotes a letter f having ^ on top of the letter, and f_G denotes a letter f having a subscript G. Note that HSI is an abbreviation of Hyperspectral Image. In addition, "HSI prior network" is illustrated in FIG. 3 of the present embodiment because the hyperspectral image is used in the embodiment, and "HSI prior network" is actually a prior network which can use any medium (sound or the like).

In the present invention, by providing a, the stabilization of the learning is allowed. Details thereof are as described below. There are cases where the stability of the learning of the network based on the normal ADMM (α(k)=1) is lower than that of the network based on the HQS. Accordingly, the network may be caused to behave like the HQS at least when the learning is started by initializing α(k) to 0 and starting the learning, and the stabilization of the learning may be thereby achieved.

Figure 4:
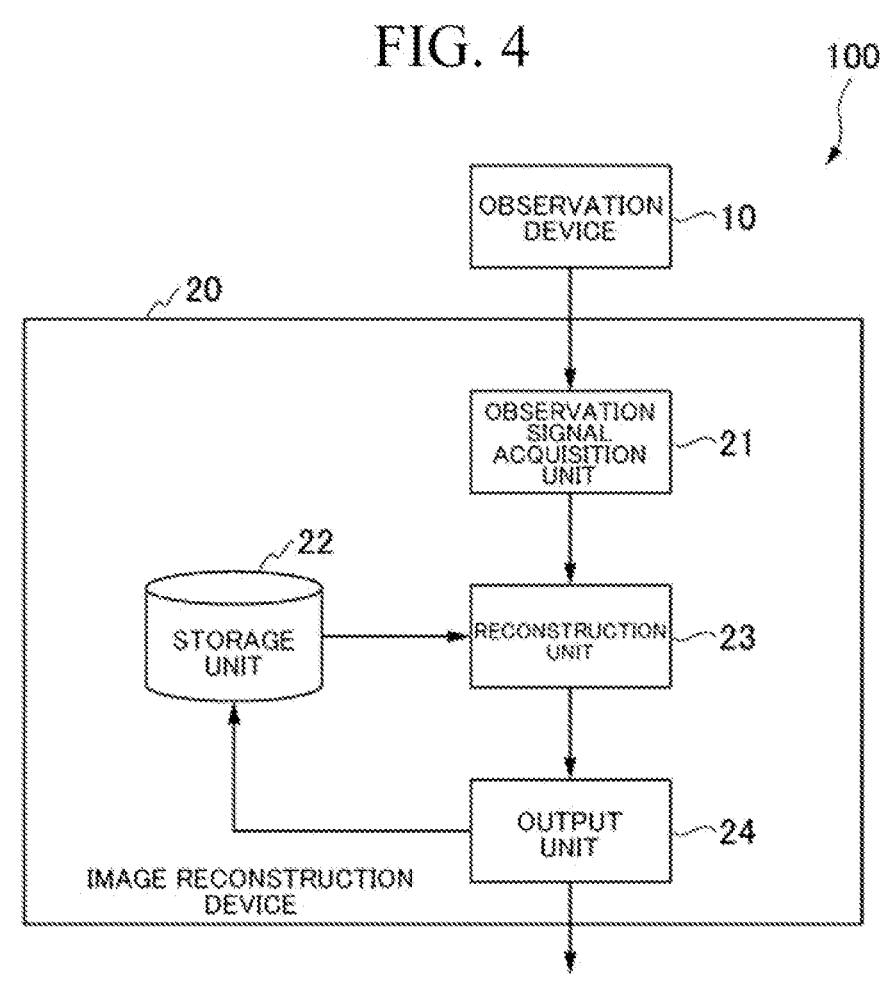
FIG. 4 is a view showing an example of the system configuration of a reconstruction system 100 in the present invention.

FIG. 4 is a view showing an example of the system configuration of a reconstruction system 100 in the present invention. The reconstruction system 100 shown in FIG. 4 is a system which uses a network which outputs the hyperspectral image shown in FIG. 3. That is, the reconstruction system 100 shown in FIG. 4 is a specific example in which the reconstruction system 100 is applied to compressed sensing of the hyperspectral image. Note that the application of the reconstruction system 100 of the present invention does not need to be limited to the hyperspectral image. The reconstruction system 100 may also be applied to, e.g., sound or any type of data.

The reconstruction system 100 includes an observation device 10 and an image reconstruction device 20. The observation device 10 is a device which corresponds to the observation matrix ϕ applied to the image reconstruction device 20. The observation device 10 generates an observation signal g by imaging an imaging target with the compressed sensing. The observation signal 5 generated by the observation device 10 is input to the image reconstruction device 20.

Figure 5:
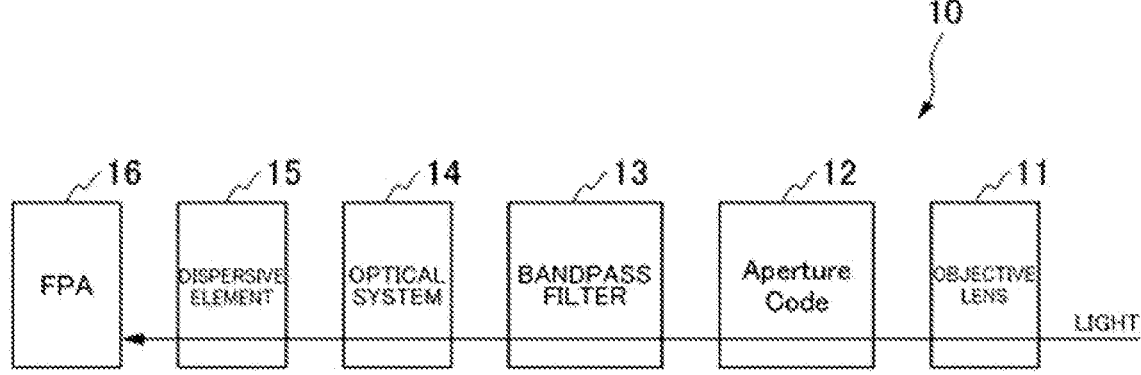
FIG. 5 is a view showing a specific example of an observation device 10.

FIG. 5 is a view showing a specific example of the observation device 10. The observation device 10 may be constituted by using, e.g., a coded aperture called CASSI and a prism. For example, the observation device 10 includes an objective lens 11, an aperture code 12, a bandpass filter 13, an optical system 14, a dispersive element 15 (e.g., a prism), and an FPA (Focal Plane Array) 16. An observation signal indicating a coded image generated by the FPA is input to the image reconstruction device 20.

Returning to FIG. 2, the description of the image reconstruction device 20 will be continued. The image reconstruction device 20 includes an observation signal acquisition unit 21, a storage unit 22, a reconstruction unit 23, and an output unit 24. A coded data acquisition unit 21 acquires the observation signal generated by the observation device 10. The observation signal acquisition unit 21 may acquire the observation signal by using any means. For example, the observation signal acquisition unit 21 may acquire the observation signal by being connected to the observation device 10 with a cable or through wireless communication. The observation signal acquisition unit 21 may acquire the observation signal by receiving the observation signal transmitted from the observation device 10 or other information equipment via a network. The observation signal acquisition unit 21 may acquire the observation signal by reading a signal from a recording medium in which the observation signal is recorded. The observation signal acquisition unit 21 may acquire the observation signal by other means.

The storage unit 22 is constituted by using a storage device such as a magnetic hard disk device or a semiconductor storage device. The storage unit 22 stores data representing a learned model which is obtained by performing learning processing with a learning apparatus 30 described later.

The reconstruction unit (reconstructor) 23 is constituted by using a processor such as a CPU (Central Processing Unit) and a memory. The processor executes a program and the reconstruction unit 23 thereby functions. Note that all or part of the functions of the reconstruction unit 23 may be implemented by using hardware such as an ASIC (Application Specific Integrated Circuit), a PLD (Programmable Logic Device), or an FPGA (Field Programmable Gate Array). The above-mentioned program may be recorded in a computer-readable recording medium. The computer-readable recording medium denotes, e.g., a portable medium such as a flexible disc, a magneto-optical disc, a ROM, a CD-ROM, or a semiconductor storage device (e.g., SSD: Solid State Drive), and a storage device such as a hard disk or a semiconductor storage device provided in a computer system. The above-mentioned program may be transmitted via a telecommunication line. The reconstruction unit 23 performs reconstruction processing on the observation signal by using the learned model stored in the storage unit 22. With such processing of the reconstruction unit 23, a hyperspectral image corresponding to a target signal is generated. The learned model may also be included in part of the above-mentioned program instead of being stored in the storage unit 22.

The output unit 24 outputs the target signal generated by the reconstruction unit 23. The output unit 24 may output the target signal by any means. The output unit 24 may perform the output by recording the target signal in a storage device such as, e.g., the storage unit 22. The output unit 24 may perform the output of the target signal by, e.g., communicating (wired or wireless communication) with other devices. Additionally, the mode of the output of the output unit 24 does not need to be particularly limited.

Figure 6:
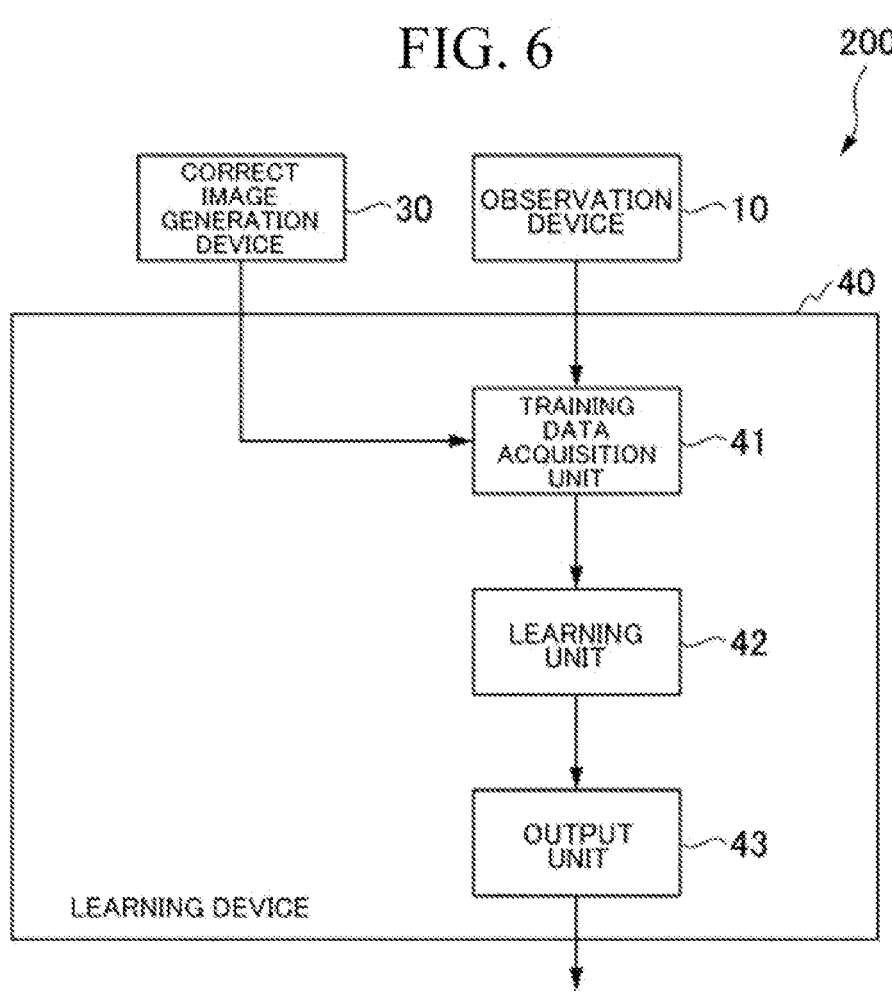
FIG. 6 is a view showing an example of the system configuration of a learning system 200 in the present invention.

FIG. 6 is a view showing an example of the system configuration of a learning system 200 in the present invention. The learning system 200 shown in FIG. 6 is a system which learns output of the hyperspectral image shown in FIG. 3. That is, the learning system 200 shown in FIG. 6 is a system which generates a learned model stored in the storage unit 22 by using the hyperspectral image which is captured in advance in order to implement the compressed sensing of the hyperspectral image. Note that the application of the learning system 200 of the present invention does not need to be limited to the hyperspectral image.

The learning system 200 includes an observation device 10, a correct image generation device 30, and a learning device (a learning apparatus) 40. The observation device 10 is preferably identical to the observation device applied to the reconstruction system 100. The correct image generation device 30 is a device which generates the hyperspectral image corresponding to the target signal f which is desired to be output by performing the reconstruction processing in the reconstruction system 100. For the same imaging target, a combination of the observation signal generated by the observation device 10 and the target signal generated by the correct image generation device 30 is input to the learning device 40 as training data.

The learning device 40 includes a training data acquisition unit 41, a learning unit (learner) 42, and an output unit 43. The training data acquisition unit 41 acquires the training data. The training data acquisition unit 41 may acquire the training data by any means. For example, the training data acquisition unit 41 may acquire the training data by being connected to the observation device 10 and the correct image generation device 30 with a cable or through wireless communication. The training data acquisition unit 41 may acquire the training data by receiving the training data transmitted from the observation device 10 and the correct image generation device 30, or other information equipment via a network. The training data acquisition unit 41 may acquire the training data by reading data from a recording medium in which the training data is recorded. The training data acquisition unit 41 may acquire the training data by other means.

The learning unit 42 is constituted by using a processor such as a CPU and a memory. The processor executes a program, and the learning unit 42 thereby functions. Note that all or part of the functions of the learning unit 42 may also be implemented by using hardware such as the ASIC, the PLD, or the FPGA. The above-mentioned program may also be recording in a computer-readable recording medium. The computer-readable recording medium denotes, e.g., a portable medium such as a flexible disc, a magneto-optical disc, a ROM, a CD-ROM, or a semiconductor storage device (e.g., SSD: Solid State Drive), and a storage device such as a hard disk or a semiconductor storage device provided in a computer system. The above-mentioned program may be transmitted via a telecommunication line. The learning unit 42 acquires each parameter of the DNN shown in FIG. 3 by performing learning processing by using the training data.

The output unit 43 outputs the learned model generated by the learning unit 42. The output unit 43 may output the learned model by any means. The output unit 43 may perform the output by, e.g., recording the learned model in a storage device. The output unit 43 may perform the output of the learned model by, e.g., communicating (wired or wireless communication) with other devices. Additionally, the mode of the output of the output unit 43 does not need to be particularly limited.

In the present invention configured in this manner, as is clear from a test result shown below, in the case where comparison is made by using the same number of stages, it is possible to obtain reconstruction performance higher than that in the technique which uses the conventional HQS. In addition, in the present invention, by reducing the number of stages, it becomes possible to achieve the reconstruction performance which is substantially equal to that of the conventional HQS at higher processing speed. Further, according to the parameters obtained by the learning, the value of a is almost 0 up to some midpoint, and approaches 1 eventually. That is, the HQS is used in the beginning, and the ADMM is used eventually. Thus, an adaptive operation which uses the HQS and the ADMM is implemented and, in the present invention, as compared with the conventional art, it is possible to achieve the reconstruction performance with a small amount of calculation when levels of accuracy are equal to each other, and with high accuracy when the amounts of calculation are equal to each other. In addition, depending on the number of stages, there are cases where it is possible to achieve a small amount of calculation with high accuracy.

Next, a description will be given of a test conducted on the algorithm of the present invention described above, and its result. In order to validate the effectiveness of a proposed algorithm, the proposed algorithm was compared with the HQS-inspired network serving as the reconstruction method disclosed in NPL 1 by a simulation which used a data set of a 31-band hyperspectral image. To be fair, test conditions disclosed in NPL 1 were followed. 250 sheets of hyperspectral images were downloaded from Reference Document 1 (size: 1300×1392×31) and Reference Document 2 (size: 3376×2704×31).

Reference Document 1: Boaz Arad and Ohad Ben-Shahar. Sparse recovery of hyperspectral signal from natural rgb images. In European Conference on Computer Vision, pp. 19-34. Springer, 2016.

Reference Document 2: Inchang Choi, Daniel S. Jeon, Giljoo Nam, Diego Gutierrez, and Min H. Kim. High-quality hyperspectral reconstruction using a spectral prior. ACM Transactions on Graphics (Proc. SIGGRAPH Asia 2017), Vol. 36, No. 6, pp. 218:1-13, 2017.

Of the 250 sheets, images having similar contents were deleted according to conditions described in Reference Document 3, and the 250 sheets were narrowed down to 200 sheets and the 200 sheets were used. The 200 sheets of images were divided into 140 sheets, 20 sheets, and 40 sheets for purposes which were train, validation, and test, respectively. The pattern of the coded aperture was generated according to the Bernoulli distribution (p=0.5), and $\phi$ was generated from the pattern according to a formula in NPL 1. A hyperspectral image was cut into patches each having a size of 64×64×31. A mini-batch size was 64. A learning rate was started from $1.0\times10^{-3}$, and was halved every time the number of epochs of 60 was completed. Each of $\varepsilon(k)$, $\eta(k)$, and $\alpha(k)$ was set to 0. The number of stages K was set to 5, 7, 9, 11, and evaluation was performed for every K.

Figure 7:
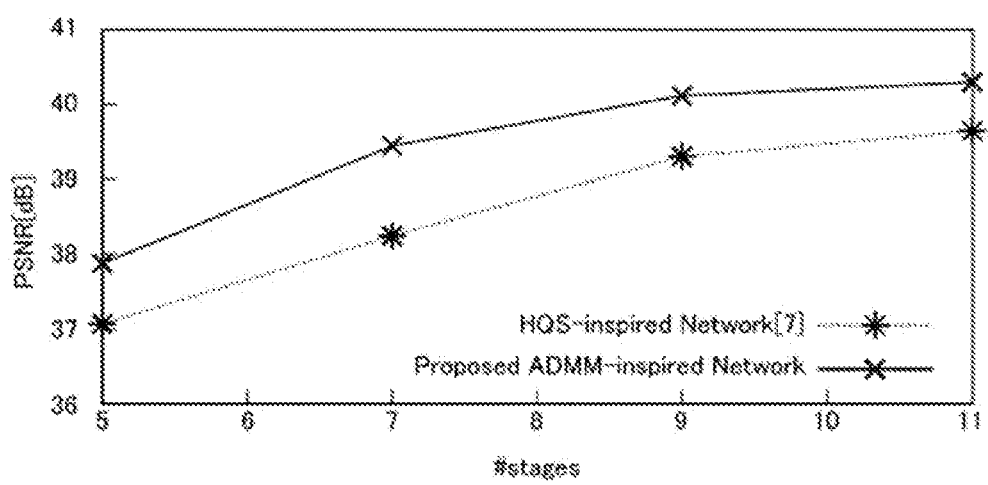
FIG. 7 is a view showing the relationship between the number of stages K and reconstruction accuracy (PSNR).

FIG. 7 is a view showing the relationship between the number of stages K and reconstruction accuracy (PSNR). In the present invention, every K exhibits accuracy higher than that of the HQS, and has a high degree of convergence.

Accuracy increases as K increases. On the other hand, its increase is saturated in the vicinity of K=9.

FIG. 8 is a table showing an evaluation result by objective indexes. Each of PSNR and SSIM is a value indicating mainly spatial quality, and denotes that the quality gets better as the value increases. SAM is a value indicating quality in wavelength, and denotes that the quality gets better as the value decreases. When K=9 is satisfied, the present invention exceeds a comparison target in all of the indexes. Further, when k=7 in the present invention is satisfied, processing at speed higher than that of the comparison target when K=9 is satisfied is achieved while superiority in reconstruction accuracy is maintained. Thus, the present invention is improved in terms of both of the speed and the accuracy.

FIG. 9 is a table showing the values of the parameter α obtained by the learning. As described above, it is apparent that the adaptive operation between the HQS and the ADM is performed.

While the embodiment of the invention has been described in detail with reference to the drawings thus far, the specific configuration is not limited to the embodiment, and design or the like which does not depart from the gist of the invention is also included.

INDUSTRIAL APPLICABILITY

The present invention can be applied to reconstruction of a signal.

REFERENCE SIGNS LIST

100 Reconstruction system
10 Observation device
20 Image reconstruction device
21 Observation signal acquisition unit
22 Storage unit
23 Reconstruction unit
24 Output unit
30 Correct image generation device
40 Learning device
41 Training data acquisition unit
42 Learning unit
43 Output unit

The invention claimed is:

1. A learning method for learning a model which reconstructs data, the learning method comprising a plurality of stages, the learning method comprising:

acquiring, by an observation device, image data, where the image data is obtained by imaging an imaging target with compressed sensing;

first sub-processing of the image data, where the first sub-processing is based on a half quadratic splitting method;

second sub-processing of the image data, where the second sub-processing is based on an alternating direction method of multipliers;

weighting sub-processing of the image data, where the weighting sub-processing determines processing in each of the plurality of stages based on a weight for determining usage of the first sub-processing and the second sub-processing in each stage;

executing each stage of the plurality of stages according to the weighting sub-processing; and generating a learned model based on parameters obtained from executing each stage in the plurality of stages, where the learned model outputs a hyperspectral image.

2. The learning method according to claim 1, further comprises performing processing at each layer of a deep neural network using training data, thereby obtaining the parameters and generating the learned model.

3. A non-transitory computer-readable medium having computer-executable instructions that, upon execution of the instructions by a processor of a computer, cause a computer to execute the learning method according to claim 1.

4. The learning method according to claim 1 wherein the learned model uses an observation matrix as input data.

5. The learning method according to claim 1 wherein the observation device includes an optical system configured to disperse light.

6. The learning method according to claim 1 further comprises initially training the learned model using the first sub-processing of the image data and subsequently training the learned model using the second sub-processing of the image data.

7. A learning apparatus for learning a model which reconstructs data, the learning apparatus having a plurality of stages and comprising:

a processor; and a storage medium having computer program instructions stored thereon, when executed by the processor, perform, in each of the plurality of stages, to:

acquire image data, where the image data is obtained by imaging an imaging target with compressed sensing;

execute a first sub-processing of the image data, where the first sub-processing is based on a half quadratic splitting method;

execute a second sub-processing of the image data, where the second sub-processing is based on an alternating direction method of multipliers;

execute a weighting sub-processing which determines processing in each of the plurality of stages based on a weight for determining usage of the first sub-processing and the second sub-processing in each stage;

executing each stage of the plurality of stages according to the weighting sub-processing; and generating a learned model based on parameters obtained from executing each stage in the plurality of stages, where the learned model outputs a hyperspectral image.

* * * * *